United States Patent
Walus

[15] 3,691,126
[45] Sept. 12, 1972

[54] AQUEOUS DISPERSIONS OF AZIRIDINYL ACRYLATE OR METHACRYLATE ACRYLIC GRAFT COPOLYMERS

[72] Inventor: Aloysius N. Walus, Flint, Mich.
[73] Assignee: E. I. du Pont de Nemours and Company, Wilmington, Del.
[22] Filed: Dec. 22, 1970
[21] Appl. No.: 100,796

[52] U.S. Cl......260/29.6 RW, 260/29.6 HN, 260/29, 260/29.6 WB, 260/29.6 TA, 260/29.6 RB, 260/881, 260/885
[51] Int. Cl...........................C08f 45/24, C09d 5/02
[58] Field of Search......260/29.6 HN, 29.6 WB, 29.6 TA, 260/29.6 RB, 29.6 RW, 881, 885

[56] References Cited

UNITED STATES PATENTS

| 3,480,601 | 11/1969 | Ashby et al.............260/86.1 |
| 3,261,796 | 7/1966 | Simms................260/29.6 HN |
| 3,261,797 | 7/1966 | McDowell et al..260/29.6 HN |
| 3,309,331 | 3/1967 | McDowell et al..260/29.6 HN |
| 3,413,272 | 11/1968 | Rees..................260/29.6 TA |
| 3,475,388 | 10/1969 | Yocum......................260/873 |
| 3,261,799 | 7/1966 | Vermont............260/29.6 HN |
| 3,386,939 | 6/1968 | Mesec................260/29.6 TA |
| 3,547,845 | 12/1970 | Pinkney..............260/29.6 TA |
| 2,795,564 | 6/1957 | Conn et al..........260/29.6 TA |
| 3,501,432 | 3/1970 | Wright et al..............260/29.6 |

*Primary Examiner*—Julius Frome
*Assistant Examiner*—David A. Jackson
*Attorney*—Hilmar L. Fricke

[57] ABSTRACT

The aqueous polymer dispersion is utilized as a coating composition and consists essentially of a graft copolymer dispersed in water. The backbone of the graft copolymer is insoluble in water and is of polymerized units of methyl methacrylate, butyl methacrylate, acrylonitrile and mixtures of these constituents and has grafted to the backbone through an aziridinyl acrylate or methacrylate coupling unit a side chain that is soluble in water and thereby disperses the polymer in the aqueous carrier. The composition is particularly useful as an exterior finish for automobiles and trucks.

10 Claims, No Drawings

3,691,126

AQUEOUS DISPERSIONS OF AZIRIDINYL ACRYLATE OR METHACRYLATE ACRYLIC GRAFT COPOLYMERS

BACKGROUND OF THE INVENTION

This invention relates to an aqueous dispersion which is utilized as a coating composition, and in particular, to a self stabilized aqueous dispersion of a graft copolymer.

Aqueous polymeric dispersions that are utilized as coating compositions are well known in the art as shown by Conn et al. U.S. Pat. No. 2,795,564, issued June 11, 1957; Simms U.S. Pat. No. 3,261,796, issued July 19, 1966; McDowell et al. U.S. Pat. No. 3,309,331, issued Mar. 14, 1967 and McDowell et al. U.S. Pat. No. 3,261,797, issued July 19, 1966. These compositions form excellent exterior and interior house paints, however, the use of surfactants in these compositions to disperse the polymer and to obtain a stable dispersion is undesirable in finishes utilized over metals, and in particular, for the exterior finishes of automobiles and trucks. These compositions do not have the resistance to deterioration from weathering, high gloss, buffability, scratch and mar resistance and resistance to solvent crazing and water spotting as is required by the automobile and truck manufacturing industry.

Coating compositions have been prepared from copolymers utilizing aziridinyl alkyl acrylates or methacrylates as shown in Ashby et al. U.S. Pat. No. 3,480,601, issued Nov. 25, 1969, but these polymers do not form high quality aqueous dispersions nor do the coatings formulated from these polymers have the physical properties required by the automobile and truck manufacturing industry. The novel aqueous dispersion of this invention is self stabilized and does not contain surfactants and utilizes as the film-forming constituent an acrylic graft copolymer having an aziridinyl acrylate or methacrylate as the coupling unit and forms finishes of exceptional high quality that can be utilized on the exterior of trucks and automobiles. Also, the novel dispersion can be easily made by conventional techniques, is stable for long periods of time and can readily be formulated with conventional pigments and plasticizers to form high quality coating compositions.

SUMMARY OF THE INVENTION

The aqueous polymeric coating composition of this invention, comprises 5–70 percent by weight of a uniformly dispersed film-forming polymer in an aqueous liquid containing up to 45 percent by weight, based on the weight of the liquid, of a water miscible solvent for the polymer; wherein the film-forming polymer has a number average molecular weight of 20,000–200,000 and consists essentially of a graft copolymer having a backbone segment and a polymeric side chain segment wherein 1. the polymeric backbone segment of the polymer comprises 70–95 percent by weight, based on the weight of the copolymer, and consists essentially of polymerized monomer units of methyl methacrylate, butyl methacrylate, acrylonitrile and mixtures thereof; and correspondingly,
2. the polymeric side chain segments comprises 30–5 percent by weight of the copolymer and are grafted into the backbone segment of the copolymer through a coupling unit that is polymerized to the backbone that has the formula

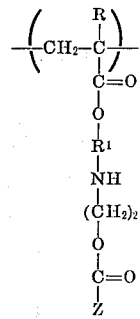

wherein R is either H or —CH$_3$; R$^1$ is an alkylene group having one to eight carbon atoms; Z is a polymer segment that has a number average molecular weight of 3,000–15,000 and consists essentially of 30–70 percent by weight, based on the weight of the polymeric side chain segment, of polymerized units of an $\alpha,\beta$-ethylenically unsaturated carboxylic acid, and correspondingly, 70–30 percent by weight, based on the weight of the polymeric side chain segment, of polymerized units of alkyl acrylate, alkyl methacrylate, styrene, hydroxy alkyl acrylate, hydroxy alkyl methacrylate, and mixtures thereof, wherein the alkyl groups contain one to three carbon atoms.

DESCRIPTION OF THE INVENTION

The novel aqueous dispersion of this invention contains 5–70 percent by weight of a film-forming polymer that is uniformly dispersed in an aqueous liquid. Preferably, the solids content of the aqueous composition is 30–60 percent by weight. By utilizing the dispersion, coatings can be applied which have a substantially higher polymer solids content than conventional lacquers and enamels and uniform and even coverage can be obtained with the use of only two coats which has not been possible with conventional solution type coating compositions. This has a cost saving advantage in the automobile and truck manufacturing industry and reduces air pollution to a substantial extent since very little or no solvent is used in the coating composition.

The graft copolymers utilized in the novel aqueous dispersion of this invention is prepared by first forming a prepolymer which is the side chain segment of the graft copolymer by using conventional polymerization techniques for acrylic polymers. This prepolymer, the backbone monomer units, and an aziridinyl compound are then reacted to form the graft copolymer. The aziridinyl compound first reacts with the prepolymer to form a prepolymer which has one site of ethylenic unsaturation. This prepolymer polymerizes with the backbone monomer units to form the graft copolymer. The resulting polymer has a number average molecular weight of 20,000–200,000. Preferably, copolymers are utilized in the coating composition which have a molecular weight of 30,000–100,000 and contains 75–90 percent by weight of the backbone segment and correspondingly 25–10 percent by weight of the side chain segments.

The prepolymer which forms the side chain of the graft copolymer is prepared by conventional polymerization techniques in which the monomer constituents are blended with solvents and polymerization catalysts and heated to about 75°–150° C. for about 2–6 hours to form a prepolymer of a low number average molecular weight of about 3,000–15,000, preferably about 5,000–12,000.

Typical solvents and diluents which are used to prepare this prepolymer are, for example, toluene, xylene, butyl acetate, acetone, methylisobutyl ketone, methylethyl ketone, butyl alcohol, cellosolve, cellosolve acetate, ethylene glycol, vinyl ethyl ether, hexane and other aliphatic, cycloaliphatic, aromatic hydrocarbons, esters, ethers, ketones and alcohols.

About 0.1–4 percent by weight, based on the weight of the monomers used to prepare the prepolymer, of a polymerization catalyst is used, such as ditertiary butyl peroxide, cumene hydroperoxide, azo-bis-isobutyronitrile.

The prepolymer contains about 30–70 percent by weight, based on the weight of the prepolymer, of polymerized units of an $\alpha,\beta$-ethylenically unsaturated monovinylene carboxylic acid. Typically useful unsaturated monocarboxylic acids used to prepare this prepolymer are, for example, acrylic acid, methacrylic acid, crotonic acid, itaconic acid, ethylacrylic acid and the like. Acrylic acid and methacrylic acid are preferred.

Correspondingly, about 70–30 percent by weight, based on the weight of the prepolymer, is of polymerized units of alkyl acrylates, alkyl methacrylates, styrene, hydroxy alkyl acrylates or methacrylates, wherein the alkyl groups have one to three carbon atoms. Typical monomer units are, for example, methyl methacrylate, propyl methacrylate, ethyl acrylate, propyl acrylate, hydroxy ethyl methylacrylate, hydroxy propyl methacrylate, and the like.

The technique that provides a high quality graft copolymer is to neutralize one of the carboxyl groups of the prepolymer with a basic compound and then react this prepolymer with the aziridinyl compound. The molar ratio of basic compound to carboxyl equivalent of prepolymer to aziridinyl compound is maintained at 1:1:1. Typical basic compounds that can be used volatilize below 100° C. and are, for example, ammonia, ammonium hydroxide, primary amines, secondary amines, tertiary amines and polyamines, such as monoethanolamine, diethanolamine, diethylamine, triethylamine, methyldiethanolamine and the like.

The graft copolymer is prepared by using the aforementioned polymerization techniques in which the constituents may be further blended with solvents and additional polymerization catalysts are added and the reaction mixture is heated to about 75°–150° C. for about 2–6 hours to form the graft copolymer. The aforementioned polymerization catalysts are utilized and any of the aforementioned solvents can also be used to prepare the graft copolymer.

Typical monomer units which are used to form the backbone of the polymer are methyl methacrylate, butyl methacrylate, acrylonitrile and mixtures of these monomers.

Optionally, up to 15 percent by weight, based on the weight of the backbone of the graft copolymer, of acrylic adhesion promoting units can be added to the backbone segment. Typical adhesion promoting monomers that can be used are aminohydroxy alkyl methacrylates and acrylates, such as aminohydroxy propyl methacrylate, aminohydroxy propyl acrylate, aminohydroxy ethyl methacrylate and the like; aminoalkyl methacrylates or acrylates, such as aminopropyl methacrylate, aminoethyl methacrylate, aminoethyl acrylate; ethylenically polymerizable oxazolidine compounds, such as 3-(2-methacryloxyethyl)-2,2-spirocyclohexyl oxazolidine.

In the resulting graft copolymer, the side chain segments are soluble in water and disperse the polymer in water while the backbone segment is water insoluble. By utilizing the correct amount of the side chain constituents and the preferred monomer units in the side chain segment, excellent water dispersibility of the polymer can be obtained. The copolymer may be neutralized with any of the aforementioned basic compounds to more readily disperse the polymer in the aqueous liquid. The resulting polymer dispersion has excellent stability. Additional surfactants, such as the typical nonionic and anionic surfactants may be utilized but are not required. Water miscible solvents for the polymer may be added in amounts of up to 45 percent by weight, based on the weight of the aqueous liquid, to aid in dispersibility of the polymer.

The aziridinyl compound utilized in this invention to form the graft copolymer has the formula

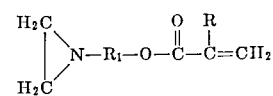

where R is H or —$CH_3$ and $R^1$ is an alkylene group having one to eight carbon atoms. Typical aziridinyl compounds of this type are aziridinyl acrylates or methacrylates, such as 2-(1-aziridinyl) alkyl acrylate, such as 2-(1-aziridinyl) ethyl acrylate, 2-(1-aziridinyl) propyl acrylate, 2-(1-aziridinyl) butyl acrylate, 2-(1-aziridinyl) hexyl acrylate, 2-(1-aziridinyl) octyl acrylate, 2-(1-aziridinyl) methyl methacrylate, 2-(1-aziridinyl) propyl methacrylate, 2-(1-aziridinyl) butyl methacrylate, 2-(1-aziridinyl) hexyl methacrylate, 2-(1-aziridinyl) octyl methacrylate. One particularly preferred compound is aziridinyl ethyl methacrylate since it forms graft copolymers of high quality.

Conventional plasticizers are compatible with the coating composition. About 1–30 percent by weight, based on the weight of the film-forming constituents, of a plasticizer can also be used in the composition, such as butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamiethylene diphthalate, di(methylcyclohexyl) phthalate.

Other plasticizers which can be used are epoxidized soya bean oil, oil free and oil modified alkyds and polyesters, such as polyethylphthalate esters, polyalkylene adipate esters, or polyarylene adipate esters.

Pigments are used in the novel organosol of this invention in the amounts of 0.1–20.0 percent by weight, and preferably, about 0.3–6.0 percent by weight of pigment is used. Preferably, the pigment is formed into a mill base using conventional techniques and then blended with the dispersions. Examples of the great variety of pigments which are used in the novel coating composition of this invention are metallic oxides, preferably titanium dioxide, zinc oxide, and the like, metal hydroxides, metal flakes, metal powder chromates, such as lead chromate, sulfides, sulfates, carbonates, carbon black, silica, talc, china clay, lead and iron blues, organic reds, maroons, organic dyes, lakes, etc.

The novel polymer dispersion of this invention can be formed by the simple addition of water to the polymer solution after the graft copolymer has been prepared, preferably, while the polymer solution is still warm. Additional water miscible co-solvents can be added to aid in the dispersing of the polymer particles. Any of the aforementioned solvents that are water miscible can be used for this purpose. The resulting aqueous dispersion has a polymer particle size in the dispersion of about 0.1 to 2.0 microns.

Coalescing solvents are utilized with the novel aqueous dispersion to coalesce the polymer on the substrate. The requirement for these coalescing solvents is that the solvent must be miscible with water and to have a boiling point of at least 110° C. Typical coalescing solvents that can be used are cellosolve acetate, diacetone alcohol, butyl cellosolve, ethylene glycol diacetate, butyl cellosolve diacetate, butyl carbitol, dibutyl carbitol, ethylene glycol monoethyl ether, and the like. These coalescing solvents may be blended with the novel aqueous dispersion or may be sprayed with the novel aqueous dispersion unto the substrate.

The novel aqueous coating compositions of this invention can be applied to a variety of substrates, for example, suitably primed metal substrates, wood, glass, plastics, such as polypropylene, styrene copolymers of styrene and the like, by any of the usual application methods, such as spraying, electrospraying, dipping, brushing, flow coating and the like. These coatings are baked at about 110°–200° C. for about 10–60 minutes. The resulting coating is about 1-5 mils thick, preferably 1–3 mils thick, and can be rubbed or polished in accordance with conventional techniques, if desired, to improve smoothness or apparent gloss or both.

Preferably, the novel coating composition of this invention is applied over a suitably primed and/or sealed metal substrate. Typical alkyd primers or epoxy primers pigmented with iron oxide, carbon black, titanium dioxide and the like can be used. Typical sealers used over these primers are of epoxy acrylic copolymers as disclosed in U.S. Pat. No. 3,509,086, issued Apr. 28, 1970.

The dried coatings of the compositions of this invention are characterized by increased freedom from water spotting and have excellent craze resistance in combination with outstanding durability and gloss retention. Coatings of this invention also have good gasoline resistance and resistance to aromatic solvents and excellent adhesion to metal substrates.

The novel coating compositions of this invention find particular utility in coating articles such as in the automobile and truck industry which are mass produced. Also, with the novel coating compositions of this invention repairs can be made and the repaired spots blend with adjacent or overlapping areas.

The following Examples illustrate this invention. The parts and percentages are by weight unless otherwise specified.

EXAMPLE 1

A prepolymer is prepared of methyl methacrylate/acrylic acid in a weight ratio of 70/30 by charging the following ingredients into a conventional polymerization vessel equipped with a stirrer and a reflux condenser:

| | Parts By Weight |
|---|---|
| Portion 1 | |
| Ethylene glycol mono-ethyl ether | 640 |
| Anhydrous isopropyl alcohol | 160 |
| Portion 2 | |
| Methyl methacrylate monomer | 560 |
| Acrylic acid monomer | 240 |
| Azo-bis-isobutyronitrile | 16 |
| Portion 3 | |
| Anhydrous isopropyl alcohol | 178 |
| Total | 1794 |

Portion 1 is charged into the reaction vessel and thoroughly blended and heated to the reflux temperature of the mixture which is about 110° C. Portion 2 is premixed and slowly added over a 2-hour period while maintaining the reaction mixture at its reflux temperature. The reaction mixture is maintained at its reflux temperature for an additional hour and Portion 3 is added, thoroughly mixed and the reactants are cooled to room temperature.

The resulting polymer solution has a total solids content of 45 percent and the polymer has an acid number of 229, a Gardner Holdt viscosity measured at 25° C. of Y. The polymer has a relative viscosity of 1.078 measured at 0.5 percent polymer solids in ethylene dichloride solvent at 25° C.

A graft copolymer dispersion is then prepared as follows:

| | Parts By Weight |
|---|---|
| Portion 1 | |
| Prepolymer solution prepared above (45% polymer solids) | 356.0 |
| Anhydrous isopropyl alcohol | 504.0 |
| Dionized water | 150.0 |
| Portion 2 | |
| Triethyl amine | 50.0 |
| Portion 3 | |
| Methyl methacrylate monomer | 635.2 |
| 2-(1-Aziridinyl)ethyl methacrylate | 4.8 |
| Portion 4 | |
| Azo-bis-isobutyronitrile | 3.0 |
| Portion 5 | |
| Triethyl amine | 17.0 |
| Portion 6 | |
| Azo-bis-isobutyronitrile | 2.0 |
| Portion 7 | |
| Deionized water | 800.0 |
| Deionized water | 710.0 |
| Total | 2522.0 |

Portion 1 is charged into a reaction vessel and thoroughly mixed, then Portion 2 is added. Portion 3 is premixed and added to the reaction vessel and the reaction mixture is heated to its reflux temperature of about 85° C. and held at its reflux temperature for about 1 hour. Portion 4 is then added and the reaction mixture is held at its reflux temperature for 30 minutes. Portion 5 is added and the reaction mixture is held at reflux for 30 minutes. Portion 6 is added and then Portion 7 is slowly added to the reaction mixture and the reaction mixture is held at its reflux temperature for about 45 minutes. Portion 8 is then slowly added over a 30-minute period and the reaction mixture is cooled to room temperature.

The resulting polymer dispersion has a polymer solids content of 24.9 percent and the polymer has an acid number of 45.2 and a relative viscosity measured at 25° C. of 1.393. measured at 0.5 percent polymer solids in ethylene dichloride at 25°C. The dispersion is stable for long periods of time.

A film of the dispersion is applied to a steel plate coated with a conventional alkyd primer and with a conventional sealer using a doctor blade and baked at 160° C. for 30 minutes. The resulting film was clear, tough and durable and had an excellent appearance.

EXAMPLE 2

A prepolymer is prepared by reacting the following ingredients:

| | Parts By Weight |
|---|---|
| Portion 1 | |
| Ethylene glycol mono-ethyl ether | 750 |
| Anhydrous isopropyl alcohol | 750 |
| Portion 2  Methyl methacrylate monomer | 500 |
| Acrylic acid monomer | 500 |
| Azo-bis-isobutyronitrile | 20 |
| Total | 2520 |

Portion 1 is charged into a reaction vessel and heated to its reflux temperature which is about 95° C. Portion 2 is premixed and slowly added to the reaction vessel over a 2-hour period while the reaction is maintained at its reflux temperature. After Portion 2 is added, the reaction mixture is held at its reflux temperature for an additional hour. The resulting polymer has an acid number of 379, a relative viscosity of 1.6 measured at 0.5 percent polymer solids methylene dichloride at 25° C. The composition has a polymer solids content of 42% and a Gardner Holdt viscosity measured at 25° C. of U.

A graft copolymer dispersion is prepared as follows:

| | Parts By Weight |
|---|---|
| Portion 1 | |
| Prepolymer solution prepared above (42% solids) | 100 |
| Ethylene glycol mono-ethyl ether | 256 |
| Anhdyrous isopropyl alcohol | 200 |
| Deionized water | 200 |
| Portion 2 | |
| Triethyl amine | 28.0 |
| Anhydrous isopropyl alcohol | 56.0 |
| Portion 3 | |
| 2-(1-Aziridinvl)ethyl methacrylate | 1.5 |
| Methyl methacrylate monomer | 208.5 |
| Portion 4 | |
| Methyl methacrylate monomer | 250 |
| Azo-bis-isobutyronitrile | 2.5 |
| Portion 5 | |
| Azo-bis-isobutyronitrile | 2.0 |
| Portion 6 | |
| Deionized water | 450.0 |
| Total | 1754.5 |

Portion 1 is premixed and charged into a reaction vessel equipped with a reflux condenser. Portion 2 is premixed and added to the reaction vessel with Portion 1 and thoroughly mixed. Portion 3 is premixed and added to the reaction vessel and the reaction mixture while being agitated is heated to its reflux temperature of about 85° C. and held at reflux for about 1 hour. Portion 4 is then premixed and added and the reaction mixture is held at its reflux temperature for an additional hour. Portion 5 is then added and then Portion 6 is slowly added over a 20-minute period while maintaining the reaction mixture at its reflux temperature. The reaction mixture is then cooled to room temperature.

The resulting polymer dispersion has a total solids content of 29 percent and has a Gardner Holdt viscosity at 25° C. of E. The polymer has an acid number of 29.5 and a relative viscosity of 1.173 measured at 0.5 percent polymer solids in dimethyl formamide at 25° C.

A film of the above prepared polymer solution is applied to a glass plate using a doctor blade, and the coating is baked for 30 minutes at 160° C. The resulting film is tough, durable and has an excellent appearance.

A mill base is prepared as follows:

| | Parts By Weight |
|---|---|
| Water/solvent mixture (water/ethylene glycol monoethyl ether acetate/ethylene glycol monobutyl ether, weight ratio 1/1/3) | 26.9 |
| Plasticizer (Benzyl Texanol* phthalate) | 4.3 |
| Titanium dioxide pigment | 43.0 |
| Polymer dispersion (prepared above 29% solids) | 25.8 |
| Total | 100.0 |

*Texanol-2,2,4trimethyl-1,3-pentane diol isobutyrate.

The above ingredients are premixed and then charged into a conventional sand mill and ground to 0.5 mil fineness. The resulting mill base has a pigment to binder ratio of 370/100.

A lacquer is prepared by blending the following ingredients:

| | Parts By Weight |
|---|---|
| Polymer dispersion (prepared above) | 222.0 |
| Mill base (prepared above) | 86.0 |
| Benxyl Texanol* phthalate plasticizer | 26.3 |
| Total | 334.3 |

The lacquer is reduced to a spray viscosity of a No. 4 Ford cup by reducing the lacquer about 60 percent by volume with a solvent blend of ethylene glycol monobutyl ether/ethylene glycol monoethyl ether acetate/acetone/water in a weight ratio of 17/9/17/31/26.

The resulting composition is sprayed onto a steel panel coated with a conventional alkyd primer and a sealer and baked for about 30 minutes at 160° C. The resulting coating has the following properties:

| | |
|---|---|
| 20 degrees/60degrees gloss | 81/89 |
| Knoop hardness | 13.8 |
| Craze resistance to methylethyl ketone solvent | Yes |
| Gasoline resistance | Excellent |
| Total film build | 3.0 mils |

EXAMPLE 3

A graft copolymer is prepared by reacting the following ingredients:

|  | Parts By Weight |
|---|---|
| Portion 1 | |
| Prepolymer solution in Example 1 (42% solids) | 100.0 |
| Ethylene glycol mono-ethyl ether | 206.0 |
| Anhydrous isopropyl alcohol | 170.0 |
| Isobutyl alcohol | 100.0 |
| Deionized water | 150.0 |
| Portion 2 | |
| Anhydrous isopropyl alcohol | 36 |
| Triethyl amine | 28 |
| Portion 3 | |
| 2-(1-Aziridinyl) ethyl methacrylate | 1.5 |
| Butyl methacrylate | 75.0 |
| Methyl methacrylate monomer | 233.5 |
| Portion 4 | |
| Methyl methacrylate monomer | 50.0 |
| Azo-bis-isobutyronitrile | 1.0 |
| Portion 5 | |
| Methyl methacrylate monomer | 100.0 |
| Butyl alcohol | 100.0 |
| Portion 6 | |
| Azo-bis-isobutyronitrile | 0.5 |
| Portion 7 | |
| Azo-bis-isobutyronitrile | 0.5 |
| Portion 8 | |
| Deionized water | 900.0 |
| Total | 2252.0 |

Portion 1 is premixed and added to a polymerization vessel equipped with a reflux condenser and a stirrer. Portion 2 is premixed and added and the ingredients are thoroughly blended together. Portion 3 is premixed and added and the reaction mixture while being agitated is heated to its reflux temperature which is about 85° C. and held at its reflux temperature for about 1 hour and 15 minutes. Portion 4 is then premixed and added to the reaction mixture which is held at its reflux temperature for an additional 30 minutes. Portion 5 is added and the reaction mixture is refluxed for an additional hour. Portion 6 is added and the reaction mixture is refluxed for 30 minutes. Portion 7 is added and Portion 8 is then slowly added over a 1 hour period.

A stable dispersion is formed which has a polymer solids content of 20.4 percent and the polymer has an acid number of 28.8 and a relative viscosity of 1.253 measured at 0.5 percent polymer solids in dimethyl formamide at 25° C.

A thin coating of the above prepared dispersion is applied with a doctor blade to a steel plate coated with a conventional primer and sealer and the coating is baked at about 116° C. for 30 minutes. The dried coating has an excellent appearance and is durable, tough and scratch resistant.

EXAMPLE 4

A graft copolymer is prepared by reacting the following ingredients:

|  | Parts By Weight |
|---|---|
| Portion 1 | |
| Prepolymer solution (prepared in (EXAMPLE 2) polymer solids content 42 percent | 150.0 |
| Ethylene glycol mono-ethyl ether | 341.0 |
| Anhydrous isopropyl alcohol | b 253.0 |
| Ethylene glycol mono-butyl ether | 386.0 |
| Deionized water | 300.0 |
| Portion 2 | |
| Anhydrious isoropyl alcohol | 88.0 |
| Triethyl amine | 42.0 |
| Portion 3 | |
| 2-(1-Aziridinyl) ethyl methacrylate | 2.0 |
| Methyl methacrylate monomer | 638.0 |
| Portion 4 | |
| Methyl methacrylate monomer | 250.0 |
| Azo-bis-isobutyronitrile | 4.0 |
| Portion 5 | |
| Methyl methacrylate monomer | 50.0 |
| Azo-bis-isobutyronitrile | 2.0 |
| Portion 6 | |
| Azo-bis-isobutyronitrile | 1.0 |
| Portion 7 | |
| Deionized water | 130.0 |
| Total | 3807.0 |

Portion 1 is charged into a reaction vessel equipped with a stirrer and a reflux condenser and thoroughly mixed. Portion 2 is premixed and added to the reaction vessel. Portion 3 is premixed and added to the reaction vessel and the reaction mixture is heated to its reflux temperature and held at this temperature for about 1½ hours. Portion 4 is premixed and added to the reaction mixture which is heated to its reflux temperature and held at this temperature for 1 hour and 15 minutes. Portion 5 is premixed and added to the reaction mixture and held at its reflux temperature for an additional 30 minutes. Portion 6 is added and immediately thereafter Portion 7 is slowly added over a 40-minute period.

The resulting composition is a stable emulsion having a polymer solids content of 25.6 percent, the polymer has an acid number of 22.5 and a relative viscosity of 1.191 measured at 0.5 percent polymer solids in dimethyl formamide at 25° C.

A thin coating of the above prepared emulsion is applied to a steel substrate coated with a conventional primer and a sealer and the coating is baked for 30 minutes at about 160° C. The resulting coating has an excellent appearance and is scuff and abrasion resistant.

A water-reducible clear paint composition is formulated as follows:

|  | Parts By Weight |
|---|---|
| Acetone | 10.0 |
| Benzyl Texanol phthalate plasticizer (described in Example 2) | 22.0 |
| Butyl benzyl phthalate | 2.0 |
| Butyl carbitol | 15.0 |
| Polymer dispersion prepared above (25.6% polymer solids) | 211.0 |
| Total | 260.0 |

The above ingredients are thoroughly blended to form a paint composition. This paint composition is reduced 100 percent by volume with a thinner of water/butyl carbitol in an 85/15 weight ratio. The diluted composition is sprayed onto a steel panel primed with a conventional alkyd primer pigmented with iron oxide and coated with a sealer and the coating is baked for 10 minutes at 95° C. and for 20 minutes at 165° C. The resulting coating has excellent mar and scratch resistance, excellent hardness, excellent gasoline resistance, a high craze-free temperature, a good appearance and good cold crack resistance.

What is claimed is:

1. An aqueous polymeric coating composition comprising 5–70 percent by weight of a uniformly dispersed film-forming polymer in an aqueous liquid wherein the film-forming polymer has a number average molecular weight of 20,000–200,000 and consists essentially of a graft copolymer having a backbone segment and a polymeric side chain segment wherein
    1. the backbone segment comprises 70–95 percent by weight of the copolymer and consists essentially of polymerized monomer units selected from the group consisting of methyl methacrylate, butyl methacrylate, acrylonitrile and mixtures thereof, and correspondingly, 2. the polymeric side chain segments comprise 30–5 percent by weight of the copolymer and are grafted into the backbone segment through a coupling unit that is polymerized into the backbone that has the formula

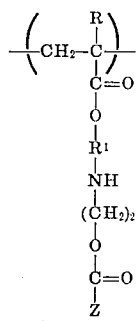

wherein R is selected from the group consisting of H and —CH$_3$; R$^1$ is an alkylene group having one to eight carbon atoms, Z is a polymer segment having a number average molecular weight of 3,000–15,000 and consists essentially of 30–70 percent by weight, based on the weight of the polymeric side chain segment, of polymerized units of an α,β-ethylenically unsaturated carboxylic acid, and correspondingly, 70–30 percent by weight, based on the weight of the polymeric side chain segment of polymerized units selected from the group consisting of alkyl acrylate, alkyl methacrylate, styrene, hydroxy alkyl acrylate, hydroxy alkyl methacrylate and mixtures thereof; wherein the alkyl groups contain one to three carbon atoms.

2. The coating composition of claim 1 containing 30–60 percent by weight of the film-forming polymer, 0.1–20 percent by weight pigment and 1 to 30 percent by weight of an organic plasticizer.

3. The coating composition of claim 2 in which the graft copolymer has a molecular weight of about 30,000 to 100,000 and the backbone segment comprises 75–90 percent by weight of the copolymer and the side chain segment having a molecular weight of 5,0w0–12,000 and correspondingly comprises 10–25 percent by weight of the copolymer.

4. The coating composition of claim 3 in which R is —CH$_3$ and R$^1$ is an alkylene group having two carbon atoms.

5. The coating composition of claim 4 in which the particle size of the graft copolymer is about 0.1–2.0 microns.

6. The coating composition of claim 5 in which the backbone consists of methyl methacrylate.

7. The coating composition of claim 5 in which the side chain consists of 30–70 percent by weight of an acid selected from the group consisting of acrylic acid, methacrylic acid, crotonic acid, itaconic acid, and ethacrylic acid and correspondingly 70–30 percent, by weight of polymerized units selected from the group consisting of methyl methacrylate, butyl methacrylate and styrene.

8. The coating composition of claim 5 in which the backbone consists essentially of methyl methacrylate and the side chain consists essentially of 40–60 percent by weight, based on the weight of the side chain, of methyl methacrylate, and correspondingly, 60–40 percent by weight of acrylic acid.

9. The coating composition of claim 5 in which the backbone consists essentially of methyl methacrylate and the side chain of 40–60 percent by weight, based on the weight of the side chain, of methyl methacrylate and 60–40 percent by weight of methacrylic acid.

10. The coating composition of claim 5 in which the backbone of the copolymer consists essentially of butyl methacrylate and methyl methacrylate and the side chain consists essentially of 40–60 percent by weight, based on the weight of the side chain of acrylic acid, and correspondingly, 60–40 percent by weight of methyl methacrylate.

* * * * *